US012800444B2

(12) United States Patent
Li et al.

(10) Patent No.: US 12,800,444 B2
(45) Date of Patent: Nov. 17, 2026

(54) SAMPLING DEVICE FOR MONITORING CARBON STORAGE IN WETLANDS

(71) Applicant: Zhejiang Academy of Forestry, Hangzhou (CN)

(72) Inventors: Hepeng Li, Hangzhou (CN); Hong Zhu, Hangzhou (CN); Xiaomian Zhang, Hangzhou (CN); Chunlei Yue, Hangzhou (CN); Guihua Zhang, Hangzhou (CN); Yaoyao Fang, Hangzhou (CN); Meirong Gao, Hangzhou (CN)

(73) Assignee: Zhejiang Academy of Forestry, Hangzhou (CN)

( * ) Notice: Subject to any disclaimer, the term of this patent is extended or adjusted under 35 U.S.C. 154(b) by 252 days.

(21) Appl. No.: 18/779,115

(22) Filed: Jul. 22, 2024

(65) Prior Publication Data

US 2025/0116574 A1 Apr. 10, 2025

(30) Foreign Application Priority Data

Oct. 7, 2023 (CN) ......................... 202311282155.4

(51) Int. Cl.
*G01N 1/08* (2006.01)

(52) U.S. Cl.
CPC ...................................... *G01N 1/08* (2013.01)

(58) Field of Classification Search
CPC ........................................................ G01N 1/08
See application file for complete search history.

(56) References Cited

U.S. PATENT DOCUMENTS

| | | | | |
|---|---|---|---|---|
| 11,988,580 B2 * | 5/2024 | Yu | .......................... | G01N 33/24 |
| 2024/0393237 A1 * | 11/2024 | Nagel | .................... | G01N 33/24 |

FOREIGN PATENT DOCUMENTS

| | | | | |
|---|---|---|---|---|
| CN | 111855276 A | * 10/2020 | ............... | G01N 1/08 |
| CN | 114184414 A | * 3/2022 | ............... | G01N 1/08 |
| CN | 117516984 A | * 2/2024 | ............... | G01N 1/08 |
| CN | 112729915 B8 | * 9/2024 | ............... | G01N 1/10 |

* cited by examiner

*Primary Examiner* — John Fitzgerald

(57) ABSTRACT

The present invention relates to the field of carbon storage monitoring technology, which is a sampling device for monitoring wetland carbon storage. The sampling device includes a square frame, a supporting frame, etc. The supporting frame is securely mounted on the square frame, with a U-shaped frame fixed at its top. The U-shaped frame houses a mounting plate, and a lifting plate is also slidingly mounted on the supporting frame. The sampling outer cylinder is fixedly mounted on the lifting plate, with an inner sampling cylinder inserted inside. Additionally, the sampling device comprises a lifting drive component, a depth control component, and a sampling component. The sampling device can both improve the accuracy of sampling work at different soil depths and eliminate detection errors with high degree of automations. At the same sampling position, multiple sets of samples can be collected simultaneously to ensure the accuracy of sampling results.

9 Claims, 6 Drawing Sheets

SAMPLING DEVICE FOR MONITORING CARBON STORAGE IN WETLANDS

CROSS REFERENCE TO RELATED APPLICATION

This application claims the priority of Chinese Patent Application No. 202311282155.4, entitled "Sampling device for monitoring carbon storage in wetlands", filed on Oct. 7, 2023, the disclosure of which is incorporated herein by reference in its entirety.

BACKGROUND OF THE INVENTION

1. Field of the Invention

The invention relates to the technical field of carbon stock monitoring, in particular to the sampling device for monitoring carbon stock in wetlands.

2. Description of Related Art

Carbon storage—the amount of carbon stored in a pool of carbon (forests, oceans, land, etc.)—occurs more than 40 times faster in wetlands than in terrestrial forest ecosystems, the monitoring of carbon storage in wetland is mainly to monitor the content and distribution of carbon elements in wetland ecosystem. The contents include monitoring the carbon storage of the Xianshan Lake Wetland ecosystem, studying the spatial and temporal evolution of carbon storage and carbon flux. The effects of hydrology, vegetation, soil, microorganism and human disturbance on carbon flux of the Xianshan Lake Wetland ecosystem were analyzed. The effects of different management and utilization modes on the carbon sequestration function of the Xianshan Lake wetland ecosystem were studied, and the technical measures and control measures to increase carbon sequestration were explored to improve the carbon sequestration capacity of the Xianshan Lake Wetland ecosystem. Therefore, the effective assessment of wetland carbon sequestration capacity and ecosystem services is an important theoretical basis for the establishment of carbon sequestration and emission reduction, but also an important basis for our country to achieve carbon neutrality, sampling devices are often required.

In the use of existing sampling devices for monitoring carbon storage in wetlands, the sampling location could not be accurately grasped for different depths of sampling work, and for the same sampling location, it is not convenient to collect multiple samples at the same time, which may lead to bias in the results of sampling, resulting in inaccurate data, affecting the follow-up work and inconvenient to use. Therefore, in view of the above situation, there is an urgent need to develop a sampling device and method for monitoring carbon storage in wetlands in order to overcome the shortcomings in current practical application.

SUMMARY OF THE INVENTION

The present invention aims to provide a sampling device and method for monitoring carbon storage in wetlands to solve the problems raised in the background technology.

To achieve the above purposes, the present invention provides the following technical proposal: A sampling device for wetland carbon stock monitoring includes a square frame, a support frame, a sampling outer cylinder and a sampling device.

The support frame: it is fixedly installed on the square frame, the top of the support frame is fixedly installed with a U-shaped frame, and the mounting plate is fixedly installed on the U-shaped frame, and the support frame is also slide-mounted with a lifting plate.

The sampling outer cylinder: it is fixedly arranged on the lifting plate, and the sampling inner cylinder is sheathed in the sampling outer cylinder.

The sampling device: it is connected with the support frame, the lifting plate and the mounting plate, respectively, and with the sampling inner cylinder, wherein, the sampling device comprises of a lift driving component, a depth control component and a sampling component.

The lift driving assembly is connected with the lifting plate and the U-shaped frame respectively, and is connected with the support frame, the depth control assembly is connected with the lifting plate and the U-FRAME respectively, and is connected with the sampling assembly through the sampling outer cylinder.

As a further scheme of the invention: The lift driving component comprises of the telescopic cylinder, the chute and the slide rail.

Telescopic cylinder: the telescopic cylinder is fixedly installed on the mounting plate, and the output end of the telescopic cylinder is fixedly connected with the lifting plate.

Chute: the chute is arranged on the support frame.

Slide Rail: the slide rail is detachable and mounted on the lifting plate, and the slide rail is also clamped in the slide groove and glide connected with the slide groove.

As a further scheme of the invention: The sampling assembly includes the support column, the baffle, the V-shaped portion and the opening and closing drive unit.

Support column: the support column is fixedly connected with the inner top wall of the sampling outer cylinder, and a plurality of sampling control plates are distributed between the support column and the sampling inner cylinder, the two ends of the sampling control plate are respectively fixed with a rotating shaft and a rotating shaft, which are rotationally connected with the sampling inner cylinder and the supporting column respectively.

Baffle: the baffle is fixedly mounted on the sampling control board.

V-shaped portion: the V-shaped portion is respectively located on two side walls of the sampling control plate.

Opening and closing drive unit: the opening and closing drive unit is connected with the sampling inner cylinder and the rotating shaft respectively, and is connected with the depth control component.

As a further scheme of the invention, the opening and closing control unit comprises of the linkage one, the drive shaft and the reset piece.

Linkage One: the number of the linkage one is plurality, and the linkage one is fixedly connected with the rotation shafts respectively, and the adjacent linkage one is connected with each other through the linkage one.

Drive shaft: the drive shaft is fixedly connected with one of the rotating shafts and one of the linkage rods, and the drive shaft is also connected with the depth control component.

Reset piece: the Reset piece is connected with the sampling outer cylinder and the driving shaft respectively.

As a further scheme of the invention, the depth control assembly includes the positioning brake box, the fixing pulley, the wiring rope and the detecting control unit.

Positioning brake box: the positioning brake box is fixed on the mounting plate, and a rotating shaft is rotated on the positioning brake box, and the end of the rotating shaft is fixed with a rewinding disk.

Fixing Pulley: the number of the fixed pulleys is plurality, and the plurality of fixed pulleys are rotationally installed on the lifting plate.

Wiring rope: one end of the wire rope is connected with the reel, and the other end of the wire rope goes around the fixed pulley and is connected with the pulling disc fixed on the driving shaft through the lifting plate and the sampling outer cylinder.

Detecting control unit: the detection control unit is connected with the positioning brake box and the rotating shaft respectively.

As a further scheme of the invention, the detection control unit comprises of the reeling motor, the brake cogging plate and the detector, the controlling cylinder, and the magnetic plate.

Reeling motor: the Reeling Motor is fixedly installed on the positioning brake box, and the output end of the reeling motor is fixedly connected with the rotating shaft. The brake cogging plate and the detector: the brake cogging plate and the detector are fixed on the rotating shaft.

The brake cogging plate and the detector: the brake cogging plate and the detector are fixed on the rotating shaft. Controller: the controller is fixedly mounted on the mounting plate, and the controller is electrically connected with the detector and the lift drive assembly, respectively.

Controlling cylinder: the control cylinder is fixedly connected with the positioning brake box, and an electromagnet is fixedly installed in the control cylinder, and the electromagnet is electrically connected with the controller.

Magnetic plate: the magnetic plate is sliding installed in the control cylinder and can be separated and connected with the electromagnet, and a connecting rod is fixed on the magnetic plate, one end of the connecting rod penetrates the control cylinder and is fixedly installed with a V-shaped slotting plate which is separable and connected with the brake cogging plate.

As a further scheme of the invention, which includes the sliding groove, the lifting column, and the filtering press plate.

Sliding Groove: the sliding groove is arranged on the sampling outer cylinder, and a connecting push plate is sliding installed in the sliding groove.

Lifting column: the lifting column is fixedly connected with the connecting push plate, and the lifting column is fixedly connected with the inner top wall of the sampling outer cylinder by a reset spring.

Filtering press plate: the filter press plate is fixedly installed on the lifting column and is sliding connected with the sampling inner cylinder.

As a further scheme of the invention, which includes the diversion transition plate, the flushing tube and the scale line.

Diversion transition plate: the diversion transition plate is connected with the sampling outer cylinder and the sampling inner cylinder respectively.

Flushing tube: the Flushing tube is fixedly installed on the lifting plate and communicated with the sampling outer cylinder.

Scale line: the scale line is located on the sampling outer cylinder.

As a further scheme of the invention, which includes the telescopic rod, the thread holes and the positioning holes.

Telescopic rod: One end of the telescopic rod is inserted into the U-shaped frame and slidably connected to the U-shaped frame. The other end of the telescopic rod is fixedly installed with a handle.

Thread holes: The number of thread holes is multiple, and the multiple thread holes are uniformly opened on the telescopic rod.

Positioning holes: The number of positioning holes is equal to the number of threaded holes, and multiple positioning holes are uniformly opened on the U-shaped frame, and the positioning holes are detachably connected to the threaded holes through locking bolts.

A sampling method for monitoring carbon storage in wetlands, which adopts the sampling device for monitoring wetland carbon storage as described above, comprising the following five steps:

Step 1: Place the square frame at the position where sampling is required, and set the number of rotations of the shaft through the controller to limit the length of the steel wire rope being pulled, thereby limiting the depth of descent of the sampling outer cylinder and the sampling inner cylinder.

Step 2: Start the telescopic cylinder, push the lifting plate to slide downwards on the support frame, and drive the sampling outer cylinder and sampling inner cylinder to move towards the soil. At the same time, pull the winding disc to rotate through the steel wire rope. When the sampling inner cylinder reaches the specified depth, under the control of the controller, the electromagnet generates magnetic repulsion with the magnetic plate, and pushes the V-shaped insertion plate to be inserted on the brake tooth slot plate, thereby stopping the winding disc and the rotating shaft.

Step 3: Under the control of the controller, the telescopic cylinder will continue to push the sampling outer cylinder and the sampling inner cylinder downwards for a certain distance. At this time, the driving shaft is pulled by the steel wire rope to rotate. The rotating driving shaft is driven by multiple linkage rods two to drive multiple rotating shafts one to rotate. The multiple rotating shafts one drives multiple sampling control boards to rotate, causing the bottom of the sampling inner cylinder to open.

Step 4: After the soil collection in Step 3 is completed, start the winding motor to drive the winding disc to rotate, so that the steel wire rope is in a relaxed state. At this time, the reset component drives the drive shaft to reverse, and through the linkage rod 2 and the rotation shaft 1, multiple sampling control boards are driven to reverse, causing the bottom of the sampling inner cylinder to close.

Step 5: Start the telescopic cylinder to pull the lifting plate upwards, and drive the sampling outer cylinder and sampling inner cylinder to move synchronously upwards, thereby driving multiple sets of soil samples collected on multiple sampling control boards to move to the ground, thus completing the soil sampling.

BRIEF DESCRIPTION OF THE DRAWINGS

Comparing with the prior technologies, the beneficial effects of the present invention including: When sampling wetland soil, first, the entire equipment can be carried by the staff to the sampling area that needs to be sampled through a U-shaped frame. According to the requirements of sampling depth, the depth control components can be set to lower the sampling outer cylinder and sampling inner cylinder. Then, the entire equipment is placed in the position that needs to be sampled, and the accuracy of positioning the sampling position can be improved through the square frame frame selection. At this time, the lifting drive component is activated, which can make the lifting plate slide downward on the support frame and drive the sampling outer cylinder and sampling inner cylinder to move into the soil. During this process, the bottom of the sampling inner cylinder can always be closed through the set sampling component. As the sampling is carried out, the outer cylinder and the sampling inner cylinder continue to move downwards. When the set depth is reached, the depth control component will drive the sampling component to work, so that the bottom of the sampling inner cylinder will automatically open. Under the driving force of the lifting drive component, the lifting plate will push the sampling outer cylinder and the sampling inner cylinder down a short distance before stopping, allowing the soil at the specified depth to enter the sampling inner cylinder, and multiple sets of soil samples can be collected simultaneously. After the sampling is completed, under the re control of the depth control component, the bottom of the sampling inner cylinder can be automatically closed. Under the drive of the lifting drive component, the sampling inner cylinder that collects multiple sets of soil samples can be pulled out of the upper part of the ground, and subsequent testing work can be carried out on the collected samples. The operation is simple, and the accuracy of sampling work for different soil depths can be improved. The automation level is high, and detection errors caused by human factors can be eliminated. For the same sampling position, multiple sets of samples can be collected simultaneously to ensure the accuracy of sampling results, providing convenience for subsequent work.

DETAILED DESCRIPTION OF THE PREFERRED EMBODIMENTS

The following is a clear and complete description of the technical scheme in the embodiment of the invention, which is obviously only a part of the embodiment of the invention, not all embodiments. Based on the embodiments of the invention, all other embodiments obtained by ordinary technicians in the field without performing creative work fall within the scope of protection of the invention.

The following provides a detailed description of the specific implementation of the present invention in conjunction with specific embodiments.

Figure 1:
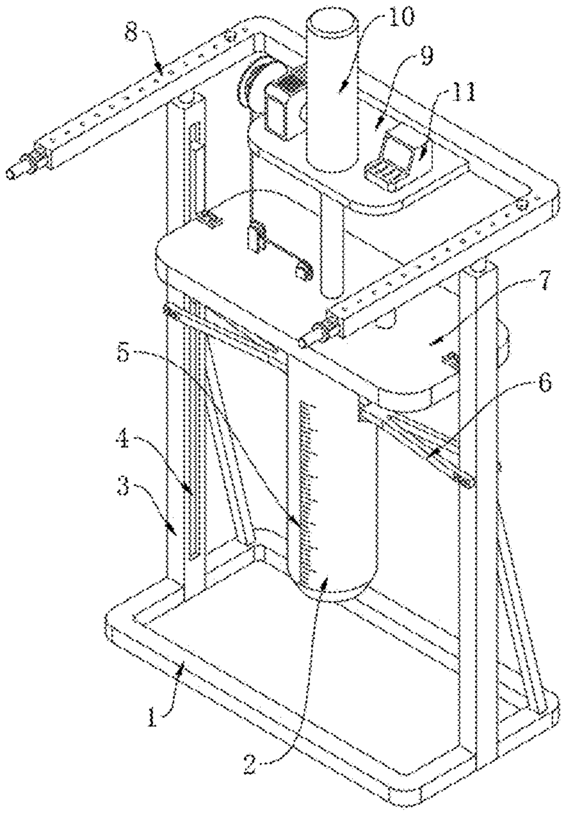
FIG. 1 is a three-dimensional schematic diagram of the sampling device for monitoring wetland carbon storage in an embodiment of the present invention.
Figure 2:
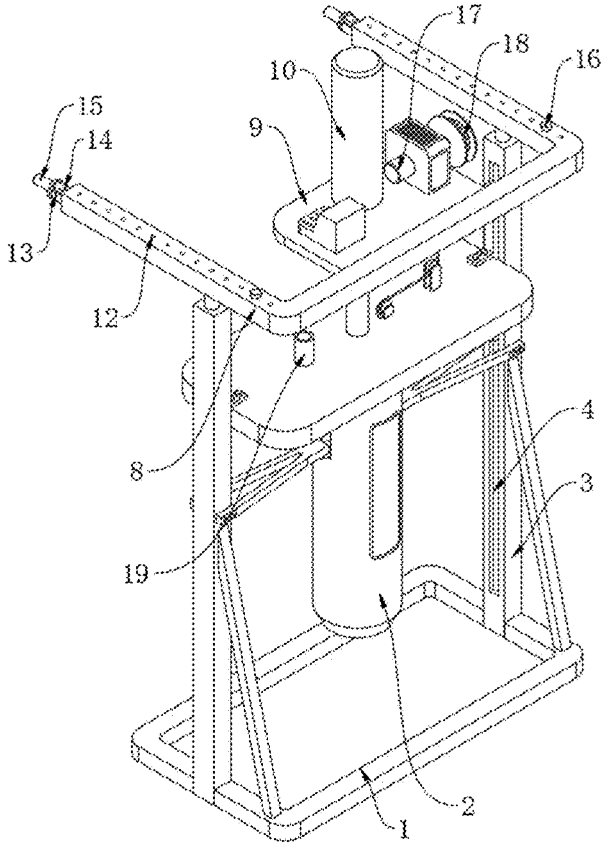
FIG. 2 is a schematic diagram of the three-dimensional structure of the sampling outer cylinder in an embodiment of the present invention.
Figure 3:
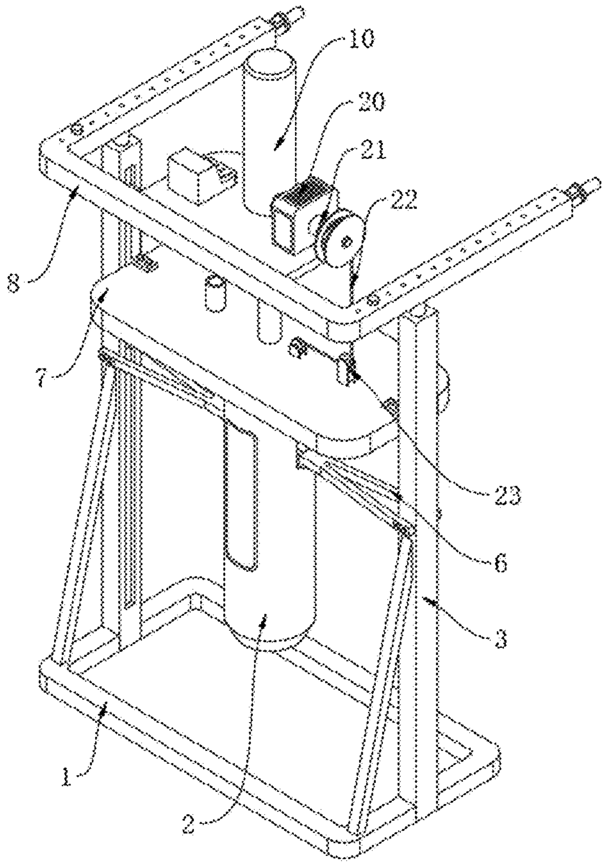
FIG. 3 is a schematic diagram of the three-dimensional structure of the support frame portion in an embodiment of the present invention.
Figure 4:
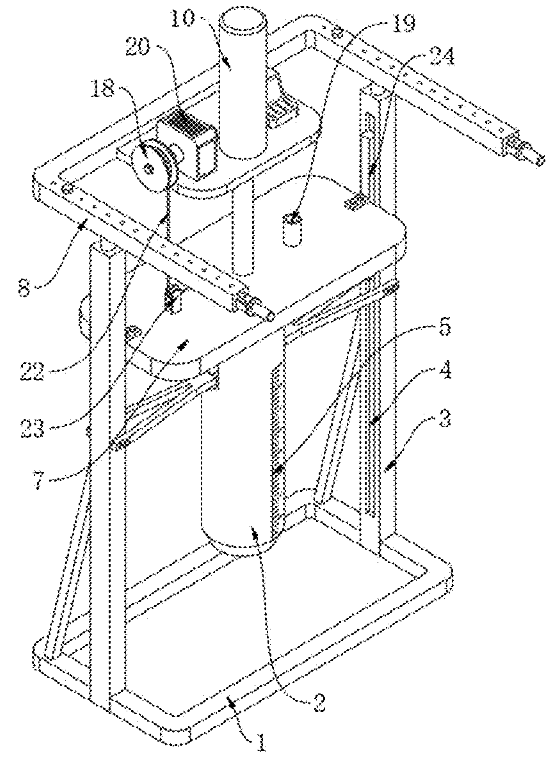
FIG. 4 is a schematic diagram of the three-dimensional structure of the lifting plate portion in an embodiment of the present invention.
Figure 5:
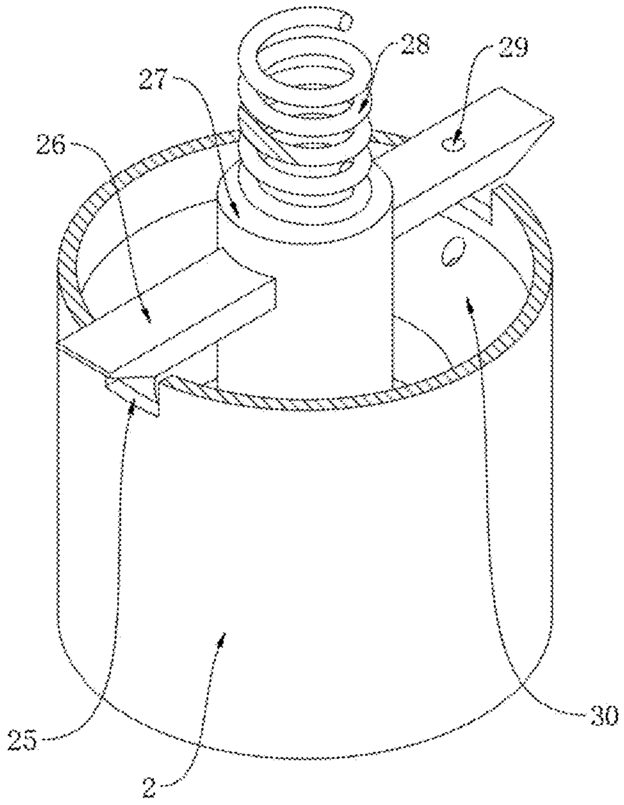
FIG. 5 is a schematic diagram of the three-dimensional structure of the lifting column portion in an embodiment of the present invention.
Figure 6:
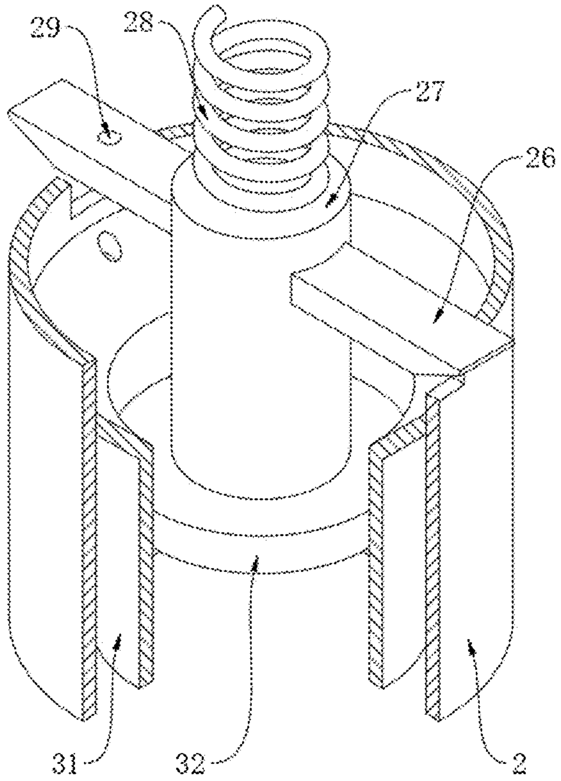
FIG. 6 is a schematic diagram of the three-dimensional structure of the medium pressure filter plate portion in an embodiment of the present invention.
Figure 7:
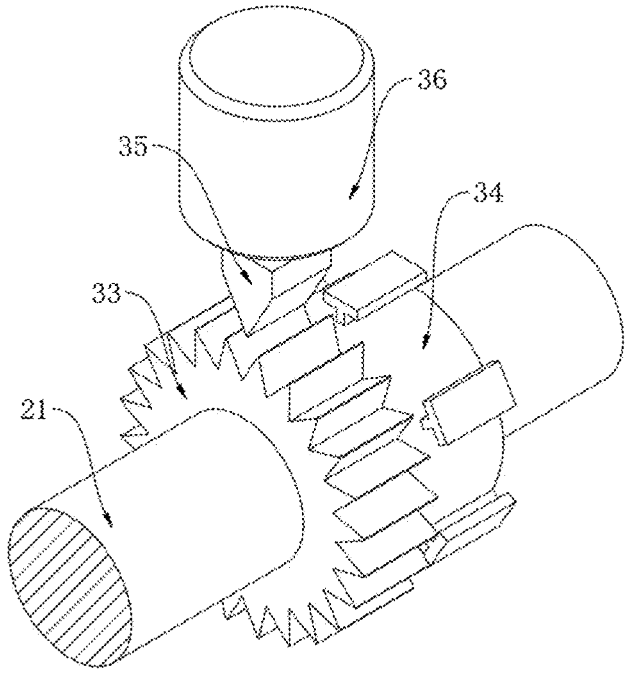
FIG. 7 is a schematic diagram of the three-dimensional structure of the brake tooth groove disc portion in an embodiment of the present invention.
Figure 8:
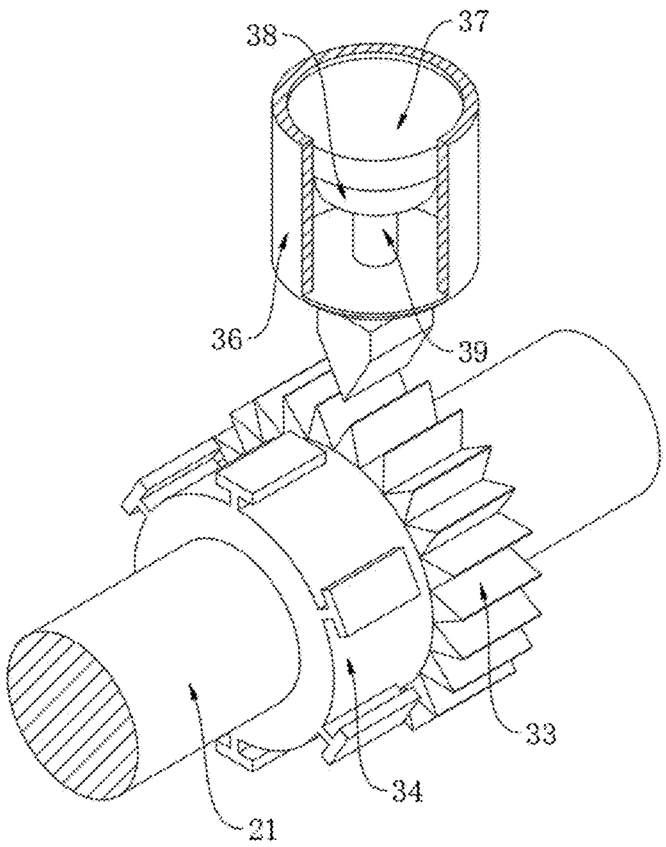
FIG. 8 is a schematic diagram of the cross-sectional structure of the control cylinder portion in an embodiment of the present invention.
Figure 9:
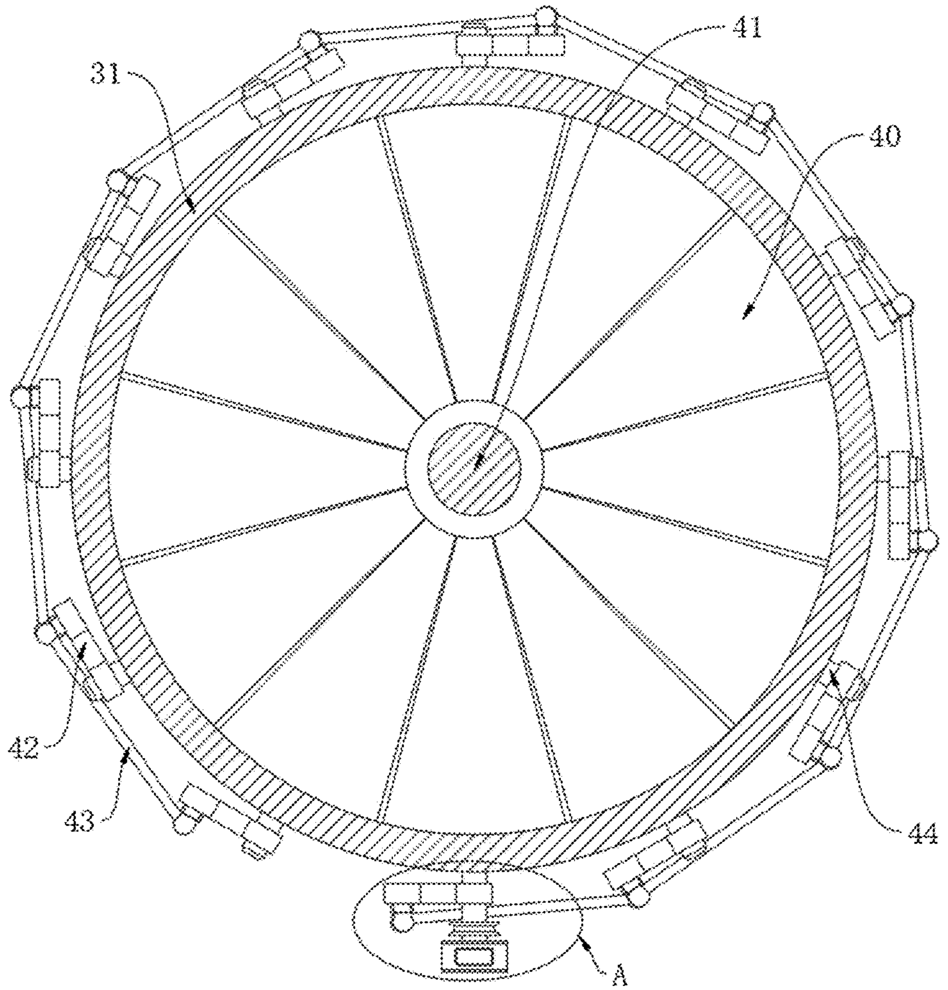
FIG. 9 is a schematic diagram of the top-down sectional structure of the sampling inner cylinder in an embodiment of the present invention.
Figure 10:
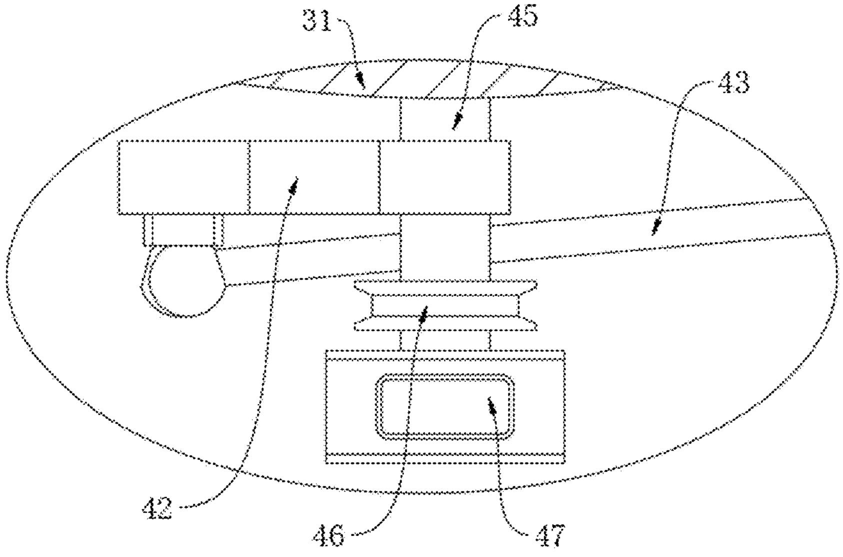
FIG. 10 is a schematic diagram of the enlarged structure of Part A in FIG. 9 of an embodiment of the present invention.
Figure 11:
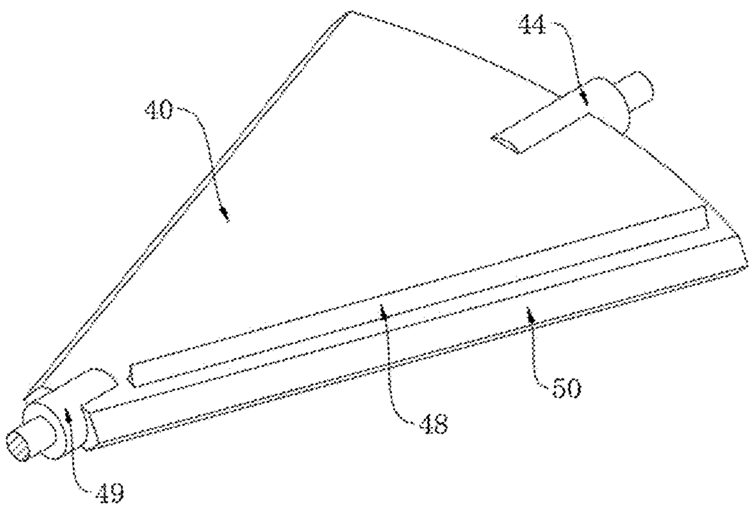
FIG. 11 is a schematic diagram of the three-dimensional structure of the sampling control board portion in an embodiment of the present invention.

Please refer to FIGS. 1 to 11, a sampling device for monitoring wetland carbon storage provided in an embodiment of the present invention. It includes the square frame 1 and the support frame 3, and the support frame 3 is fixedly installed on the square frame 1, and a U-shaped frame 8 is fixedly installed at the top of supporting the frame 3. A mounting plate 9 is fixedly installed on the U-shaped frame 8, and a lifting plate 7 is also sliding installed on the support frame 3. The sampling outer cylinder 2 is fixedly installed on the lifting plate 7, and the inner sleeve of the sampling outer cylinder 2 is equipped with a sampling inner cylinder 31. The sampling mechanism is respectively connected to the support frame 3, the lifting plate 7, and the mounting plate 9, and is connected to the sampling inner cylinder 31.

The sampling mechanism includes a lifting drive component, a depth control component, and a sampling component. The lifting drive components are respectively connected to the lifting plate 7 and the U-shaped frame 8, they are also connected to the support frame 3. The sampling component is located on the sampling inner cylinder 31, and the depth control component is connected to the lifting plate 7 and U-shaped frame 8 respectively, and it is connected to the sampling component through the sampling outer cylinder 2.

When sampling wetland soil, the entire equipment can be carried by the staff to the sampling site through the U-shaped frame 8 set up. According to the requirements of sampling depth, the depth of descent of sampling outer cylinder 2 and sampling inner cylinder 31 can be set through the set depth control component. Then, place the entire equipment at the location where sampling is required, and improve the accuracy of locating the sampling position by selecting the position through the square frame 1. At this time, activating the lifting drive component can cause the lifting plate 7 to slide downwards on the support frame 3, and drive the sampling outer cylinder 2 and the sampling inner cylinder 31 to move towards the soil. During this process, by setting the sampling component, the bottom end of the sampling inner cylinder 31 can always be kept closed. As the sampling outer cylinder 2 and the sampling inner cylinder 31 continue to move downwards, when the set value of the specified depth is reached, the depth control component will drive the sampling component to work, so that the bottom of the sampling inner cylinder 31 will automatically open. Therefore, under the driving force of the lifting drive component, the lifting plate 7 will push the sampling outer cylinder 2 and the sampling inner cylinder 31 down a short distance before stopping, so that the soil at the specified depth can enter the sampling inner cylinder 31, and multiple sets of soil samples can be collected simultaneously. After the sampling is completed, under the re control of the depth control component, the bottom end of the sampling inner cylinder 31 can be automatically closed. Under the drive of the lifting drive component, the sampling inner cylinder 31 for collecting multiple sets of soil samples can be pulled out of the upper part of the ground, and subsequent testing work can be carried out on the taken samples. This device is easy to operate, can improve the accuracy of sampling at different soil depths, and has a high degree of automation, which can eliminate detection errors caused by human factors; For the same sampling location, multiple sets of samples can be collected simultaneously, ensuring the accuracy of the sampling results and providing convenience for subsequent work.

In one embodiment of the present invention, the lifting drive component includes multiple components among Refer to FIGS. 1 to 4. The telescopic cylinder 10 is fixedly installed on the installation plate 9, and the output end of the telescopic cylinder 10 is fixedly connected to the lifting plate 7. Chute 4 is installed on support frame 3. The slide rail 24 can be detachably installed on the lifting plate 7, and it is also clamped inside the slide groove 4 and slidably connected to the slide groove 4. Before sampling, start the telescopic cylinder 10 to push the lifting plate 7 downwards and slide the slide rail 24 inside the slide groove 4, ensuring that the lifting plate 7 moves smoothly upwards or downwards and improving the structural strength of the equipment, thereby ensuring that the sampling outer cylinder 2 and the sampling inner cylinder 31 can smoothly enter the soil for sampling.

In one embodiment of the present invention, the sampling component includes multiple components among Refer to FIGS. 1 to 11. The support column 41 is fixedly connected to the inner top wall of the sampling outer cylinder 2, and multiple sampling control plates 40 are distributed between the support column 41 and the sampling inner cylinder 31. The two ends of the sampling control board 40 are fixedly installed with rotating shaft 1-44 and rotating shaft 2-49, respectively. The rotating shaft 1-44 and rotating shaft 2-49 are respectively rotationally connected to the sampling inner cylinder 31 and the support column 41. The stopper 48 is fixedly installed on the sampling control board 40. The V-shaped parts 50 are located on both sides of the wall of the sampling control plate 40. The opening and closing drive units are respectively connected to the sampling inner cylinder 31 and the rotating shaft 1-44, and are connected to the depth control component.

Refer to FIGS. 1 to 11, the opening and closing control unit includes multiple components. There are multiple linkage rods 42, which are fixedly connected to multiple rotating shafts 44, and adjacent linkage rods 42 are connected to each other through linkage rods 42. The drive shaft 45 is fixedly connected to one of the rotating shafts 44, and fixedly connected to one of the linkage rods 42, and the drive shaft 45 is also connected to the depth control component. Reset component 47 is respectively connected to sampling outer cylinder 2 and driving shaft 45. After the sampling outer cylinder 2 and sampling inner cylinder 31 reach the specified depth, the depth control component is in a braking state, while the sampling outer cylinder 2 and sampling inner cylinder 31, driven by the telescopic cylinder 10, will continue to move downward for a short distance before stopping. During the process of moving this short distance, the depth control component will drive the drive shaft 45 to rotate, and under the pushing effect of the drive shaft 45, it can drive one of the linkage rods 1-42 to rotate counterclockwise. Under the transmission effect of multiple linkage rods 2-43, multiple rotating shafts 1-44 can be synchronously rotated counterclockwise, thereby causing the sampling control board 40 to flip at a certain angle within the sampling inner cylinder 31, with a range of 0-90°. When multiple sampling control boards 40 are flipped, the bottom end of the sampling inner cylinder 31 will be in an open state, allowing the specified depth of soil to enter the sampling inner cylinder 31. Under the blocking effect of the stopper 48, a set of samples can be collected on each sampling control board 40, so that multiple sets of samples can be collected at the same position to ensure the accuracy of subsequent detection results. After the sampling is completed, manually control the depth control component to reverse, causing the drive shaft 45 to lose external force. At this time, by setting the reset component 47, the reset component 47 can be connected by a torsion spring or other structures that can drive the drive shaft 45 to reverse. When the drive shaft 45 reverses, it can also drive the sampling control board 40 to reverse, so that the bottom of the sampling inner cylinder 31 is once again in a closed state, so that multiple sets of soil samples can be collected in the sampling inner cylinder 31.

Refer to FIGS. 1 to 11, the depth control component includes multiple components. The positioning brake box 20 is fixedly installed on the mounting plate 9, and a rotating shaft 21 is installed on the positioning brake box 20. The end of the rotating shaft 21 is fixedly installed with a winding disc 18. There are multiple fixed pulleys 23, all of which rotate and are installed on the lifting plate 7. One end of wire rope 22 is connected to the winding disc 18, and the other end of wire rope 22 passes through the fixed pulley 23 and passes through the lifting plate 7 and the sampling outer cylinder 2, and is connected to the pulling disc 46 fixedly installed on the drive shaft 45. The detection control unit is connected to the positioning brake box 20 and the rotary shaft 21 respectively.

Refer to FIGS. 1 to 11, the detection control unit includes multiple components. The winding motor 17 is fixedly installed on the positioning brake box 20, and the output end of the winding motor 17 is also fixedly connected to the shaft 21. The brake slot plate 33 and the detector 34 are both fixedly installed on the shaft 21. Controller 11 is fixedly installed on mounting plate 9, and is also electrically connected to detector 34 and lifting drive components, respectively. The control cylinder 36 is fixedly connected to the positioning brake box 20, and an electromagnet 37 is fixedly installed inside the control cylinder 36, which is electrically connected to the controller 11. The magnetic plate 38 is slidably installed inside the control cylinder 36 and can be separated and connected to the electromagnet 37. A connecting rod 39 is also fixedly installed on the magnetic plate 38, and one end of the connecting rod 39 passes through the control cylinder 36 and is fixedly installed with a V-shaped plug plate 35. The V-shaped plug plate 35 can be separated and connected to the brake tooth slot plate 33. Staff can set parameters on controller 11 to limit the number of rotations of detector 34. During the lowering process of the outer sampling cylinder 2 and the inner sampling cylinder 31 pushed by the lifting plate 7, one end of the steel wire rope 22 is pulled downwards, thereby pulling the winding disc 18 to rotate, so that the steel wire rope 22 wrapped on the winding disc 18 continuously detaches. When the winding disc 18 rotates, it can drive the rotation shaft 21 and detector 34 to rotate. When the sampling inner cylinder 31 reaches the specified depth, the detector 34 will feedback the signal to the controller 11, which will cause the direction of the current flowing into the electromagnet 37 to be opposite, thereby transforming the magnetic attraction effect of the electromagnet 37 on the magnetic plate 38 into a magnetic repulsion effect, and pushing the magnetic plate 38 to slide downwards in the control cylinder 36, thereby driving the connecting rod 39 and the V-shaped insertion plate 35 to move downwards until the V-shaped insertion plate 35 is inserted into the brake tooth slot plate 33, thereby positioning the brake tooth slot plate 33 and putting the shaft 21 in a braking state. At the same time, the controller 11 will also control the telescopic cylinder 10 to continue working for a short period of time before stopping, so that when the bottom of the sampling inner cylinder 31 is in an open state, the designated depth of soil can smoothly enter the sampling inner cylinder 31. In addition, by setting the winding motor 17, the steel wire rope 22 can be wound again onto the winding disc 18 when the sampling outer cylinder 2 and the sampling inner cylinder 31 are moved up.

Refer to FIGS. 1 to 11, the device also includes other multiple components. The sliding groove 25 is arranged on the sampling outer cylinder 2, and a connecting push plate 26 is installed inside the sliding groove 25. The lifting column 27 is fixedly connected to the connecting push plate 26, and the lifting column 27 is also fixedly connected to the inner top wall of the sampling outer cylinder 2 through a reset spring 28. The pressure filter plate 32 is fixedly installed on the lifting column 27 and sliding connected to the sampling inner cylinder 31.

Refer to FIGS. 1 to 11, the device also includes other multiple components. The diversion transition plate 30 is respectively connected to the sampling outer cylinder 2 and the sampling inner cylinder 31. The flushing tube 19 is fixedly installed on the lifting plate 7 and connected to the sampling outer cylinder 2. The scale line 5 is located on the sampling outer cylinder 2.

Refer to FIGS. 1 to 11, the device also includes other multiple components. One end of the telescopic rod 13 is inserted into the U-shaped frame 8 and slidably connected to the U-shaped frame 8. The other end of the telescopic rod 13 is fixedly installed with a handle 15. There are multiple threaded holes 14, which are evenly distributed on the telescopic rod 13. The number of positioning holes 12 is equal to the number of threaded holes 14, and multiple positioning holes 12 are evenly distributed on the U-shaped frame 8. Positioning hole 12 is detachably connected to threaded hole 14 by locking bolt 16.

After the sampling is completed, as the sampling outer cylinder 2 and the sampling inner cylinder 31 move upwards, the lifting column 27 and the pressure filter plate 32 will move upwards synchronously. At this point, under the pulling force of the reset spring 28, the connecting push plate 26 can be moved a certain distance from the bottom of the sliding groove 25. Among them, there is a through hole in the middle of the pressure filter plate 32 and the lifting column 27, so that the support column 41 can be inserted into the through hole and slide connected to the through hole, thereby connecting the support column 41 to the inner top wall of the sampling outer cylinder 2. At the same time, there is a perforation 29 on the connecting push plate 26, which is used to connect the steel wire rope 22 to the pulling disc 46 through the connecting push plate 26. As the sampling outer cylinder 2 continues to move upwards, the steel wire rope 22 will gradually pass through the guide transition plate 30 and enter the sampling inner cylinder 31 under the pushing force of the reset spring 28 and the lifting column 27, while the connecting push plate 26 will be pressed against the bottom of the sliding groove 25. At this time, the pressure filter plate 32 can filter soil samples above multiple sampling control plates 40, so that a large amount of water existing in the sampling inner cylinder 31 flows out to the outside of the sampling inner cylinder 31 through the V-shaped part 50, thereby avoiding the presence of a large amount of water in the soil samples during sampling work in areas with high moisture content, which affects subsequent operations. In addition, under the further pushing and limiting action of the Y-shaped push plate 6 on the connecting push plate 26, in order to ensure the filtering effect of the pressure filter plate 32, the telescopic cylinder 10 can be started after the sampling is completed, and the sampling outer cylinder 2 and the sampling inner cylinder 31 can be driven downward for a certain distance, and the bottom end of the sampling inner cylinder 31 can be close to the ground. At this time, under the pulling action of the steel wire rope 22, multiple sampling control plates 40 can be flipped, so that the bottom end of the sampling inner cylinder 31 is in an open state, and the pressure filter plate 32 is precisely located at the upper part of the diversion transition plate 30. At this point, the external high-pressure clean water connected to the flushing tube 19 will flow through the guide plate 30 and into the sampling inner cylinder 31. The sampling control plate 40, which is in an approximately vertical state, will be flushed, which is beneficial for improving the efficiency and cleanliness of cleaning. In addition, due to the close distance between the bottom of the sampling inner cylinder 31 and the ground, it can avoid splashing of the washed wastewater due to the large drop, making it easier for the sampling equipment to be put into use again in the future. In addition, in some sampling areas that are difficult for staff to reach, such as areas that may collapse, the overall sampling equipment can be separated from the staff by a certain distance through the use of telescopic rods 13 and U-shaped frames 8, which facilitates the investigation and sampling of larger areas and improves the practicality and flexibility of the equipment.

A sampling method for monitoring wetland carbon storage, which adopts the sampling device for monitoring wetland carbon storage, comprising the following steps:

Step 1: Place the square frame 1 at the position where sampling is required, and set the number of rotations of the shaft 21 through controller 11, limit the length of the steel wire rope 22 that is pulled, and then limit the depth of descent of the sampling outer cylinder 2 and the sampling inner cylinder 31.

Step 2: Start the telescopic cylinder 10, push the lifting plate 7 to slide downwards on the support frame 3, and drive the sampling outer cylinder 2 and the sampling inner cylinder 31 to move towards the soil. At the same time, pull the winding disc 18 through the steel wire rope 22 to rotate. When the sampling inner cylinder 31 reaches the specified depth, under the control of controller 11, the electromagnet 37 generates a magnetic repulsion force with the magnetic plate 38, and pushes the V-shaped insertion plate 35 to be inserted on the brake tooth slot plate 33, thereby stopping the winding disc 18 and the rotating shaft 21.

Step 3: Under the control of controller 11, the telescopic cylinder 10 will continue to push the sampling outer cylinder 2 and the sampling inner cylinder 31 downwards for a certain distance. At this time, the driving shaft 45 of the steel wire rope 22 is pulled to rotate. The rotating driving shaft 45 is driven by multiple linkage rods 2-43 to rotate multiple rotating shafts 1-44. The multiple rotating shafts 1-44 respectively drive multiple sampling control plates 40 to rotate, causing the bottom end of the sampling inner cylinder 31 to open.

Step 4: After the soil collection in Step 3 is completed, start the winding motor 17 to drive the winding disc 18 to rotate, so that the steel wire rope 22 is in a relaxed state. At this time, the reset component 47 drives the drive shaft 45 to reverse, and through the linkage rod 2-43 and the rotation shaft 1-44, multiple sampling control plates 40 are driven to reverse, which will cause the bottom end of the sampling inner cylinder 31 to close.

Step 5: Start the telescopic cylinder 10, pull the lifting plate 7 upwards, and drive the sampling outer cylinder 2 and the sampling inner cylinder 31 to move synchronously upwards, thereby driving multiple sets of soil samples collected on multiple sampling control boards 40 to move to the ground, thus completing the sampling of the soil.

What is claimed is:

1. A sampling device for wetland carbon stock monitoring, comprising:
- a square frame;
- a support frame, fixedly mounted on the square frame, wherein a U-shaped frame is fixedly mounted on a top of the support frame, a mounting plate is fixedly mounted on the U-shaped frame, and a lifting plate is slidingly mounted on the support frame;
- a sampling outer cylinder, fixedly disposed on the lifting plate, wherein a sampling inner cylinder is sleeved in the sampling outer cylinder; and
- a sampling mechanism, connected to the support frame, the lifting plate and the mounting plate, and connected to the sampling inner cylinder, wherein the sampling mechanism comprises a lift driving component, a depth control component and a sampling component; and
- wherein the lift driving component is connected to the lifting plate and the U-shaped frame, and is connected to the support frame; and the depth control component is located above the sampling inner cylinder, and the depth control component is connected to the lifting plate and the U-shaped frame, and is connected to the sampling component through the sampling outer cylinder.

2. The sampling device for wetland carbon stock monitoring as claimed in claim 1, wherein the lift driving component comprises:
- a telescopic cylinder, fixedly mounted on the mounting plate, wherein an output end of the telescopic cylinder is fixedly connected to the lifting plate;
- slide grooves, defined on the support frame; and
- slide rails, detachably mounted on the lifting plate, wherein the slide rails are clamped inside the slide grooves respectively, and are in sliding connection with the slide grooves.

3. The sampling device for wetland carbon stock monitoring as claimed in claim 1, further comprising:
- telescopic rods, wherein an end of each of the telescopic rods is inserted into the U-shaped frame, and is slidably connected to the U-shaped frame; and the other end of each of the telescopic rods is fixedly mounted with a handle;
- a plurality of thread holes, uniformly opened on each of the telescopic rods; and
- a plurality of positioning holes, wherein a number of the plurality of positioning holes is equal to that of the plurality of thread holes, the plurality of positioning holes are opened on the U-shaped frame, and the plurality of positioning holes are detachably connected to the plurality of thread holes through locking bolts.

4. The sampling device for wetland carbon stock monitoring as claimed in claim 1, further comprising:
- sliding grooves, defined on the sampling outer cylinder, wherein a connecting push plate is slidably mounted in the sliding grooves;
- a lifting column, fixedly connected to the connecting push plate, wherein the lifting column is fixedly connected to an inner top wall of the sampling outer cylinder by a reset spring; and
- a filter press plate, fixedly mounted on the lifting column, and slidably connected to the sampling inner cylinder.

5. The sampling device for wetland carbon stock monitoring as claimed in claim 4, further comprising:
- a diversion transition plate, connected to the sampling outer cylinder and the sampling inner cylinder;
- a flushing tube, fixedly mounted on the lifting plate, and connected to the sampling outer cylinder; and
- a scale line, located on the sampling outer cylinder.

6. The sampling device for wetland carbon stock monitoring as claimed in claim 1, wherein the sampling component comprises:
- a support column, fixedly connected to an inner top wall of the sampling outer cylinder, wherein a plurality of sampling control plates are distributed between the support column and the sampling inner cylinder, two ends of each of the plurality of sampling control plates are respectively fixed with a first rotating shaft and a second rotating shaft, the first rotating shaft and the second rotating shaft are multiple in quantity, and the first rotating shaft and the second rotating shaft are rotatably connected to the sampling inner cylinder and the supporting column, respectively;
- a baffle, fixedly mounted on each of the plurality of sampling control plates;
- V-shaped portions, respectively located on two side walls of each of the plurality of sampling control plates; and
- an opening and closing drive unit, connected to the sampling inner cylinder and the first rotating shaft, and connected to the depth control component.

7. The sampling device for wetland carbon stock monitoring as claimed in claim 6, wherein the opening and closing drive unit comprises:
- a plurality of first linkage rods, fixedly connected to the multiple first rotating shafts respectively, and adjacent two of the plurality of first linkage rods are connected to each other through a second linkage rod;
- a drive shaft, fixedly connected to one of the multiple first rotating shafts and one of the plurality of first linkage rods, and connected to the depth control component; and
- a reset piece, connected to the sampling outer cylinder and the driving shaft.

8. The sampling device for wetland carbon stock monitoring as claimed in claim 7, wherein the depth control component comprises:
- a positioning brake box, fixed on the mounting plate, wherein a third rotating shaft is rotatably mounted on the positioning brake box, and an end of the third rotating shaft is fixed with a reel;
- a plurality of fixed pulleys, rotatably mounted on the lifting plate;
- a wire rope, wherein an end of the wire rope is connected to the reel, and the other end of the wire rope is wound around the plurality of fixed pulleys, passes through the lifting plate and the sampling outer cylinder, and is connected to a pulling disk fixedly mounted on the driving shaft; and
- a detection control unit, connected to the positioning brake box and the third rotating shaft.

9. The sampling device for wetland carbon stock monitoring as claimed in claim 8, wherein the detection control unit comprises:
- a reeling motor, fixedly mounted on the positioning brake box, wherein an output end of the reeling motor is fixedly connected to the third rotating shaft;
- a brake cogging plate, fixedly mounted on the third rotating shaft;
- a detector, fixedly mounted on the third rotating shaft;

a controller, fixedly mounted on the mounting plate, wherein the controller is electrically connected to the detector and the lift drive component;

a control cylinder, fixedly connected to the positioning brake box, wherein an electromagnet is fixedly mounted in the control cylinder, and the electromagnet is electrically connected to the controller; and a magnetic plate, slidably mounted in the control cylinder, and separably connected to the electromagnet, wherein a connecting rod is fixed on the magnetic plate, an end of the connecting rod penetrates through the control cylinder and is fixedly mounted with a V-shaped slotting plate, and the V-shaped slotting plate is separably connected to the brake cogging plate.

* * * * *